US006717967B2

(12) United States Patent
Cliche et al.

(10) Patent No.: US 6,717,967 B2
(45) Date of Patent: Apr. 6, 2004

(54) ABSOLUTELY CALIBRATED PERIODIC FILTERS AND SOURCES

(75) Inventors: Jean-François Cliche, Charlesbourg (CA); Michel Têtu, Cap-Rouge (CA); Christine Latrasse, Québec (CA); Alain Zarka, Ste-Foy (CA)

(73) Assignee: Dicos Technologies Inc., Quebec (CA)

( * ) Notice: Subject to any disclaimer, the term of this patent is extended or adjusted under 35 U.S.C. 154(b) by 0 days.

(21) Appl. No.: 10/293,004

(22) Filed: Nov. 13, 2002

(65) Prior Publication Data

US 2003/0174743 A1 Sep. 18, 2003

Related U.S. Application Data

(60) Provisional application No. 60/364,742, filed on Mar. 18, 2002.

(51) Int. Cl.[7] .................................................. H01S 3/13
(52) U.S. Cl. .......................... 372/32; 372/98; 372/20; 372/29.01; 372/38.1
(58) Field of Search ...................... 372/32, 20, 98, 372/29.01, 38.1, 33; 250/226

(56) References Cited

U.S. PATENT DOCUMENTS

| | | | | |
|---|---|---|---|---|
| 4,091,765 A | * | 5/1978 | Lowthorp et al. | 399/268 |
| 4,856,899 A | | 8/1989 | Iwaoka et al. | 356/346 |
| 5,347,525 A | * | 9/1994 | Faris | 372/19 |
| 5,434,877 A | | 7/1995 | Chung | 372/32 |
| 5,490,157 A | * | 2/1996 | Paris et al. | 372/6 |
| 5,780,843 A | * | 7/1998 | Cliche et al. | 250/226 |
| 6,178,002 B1 | * | 1/2001 | Mueller-Wirts | 356/491 |
| 6,272,157 B1 | * | 8/2001 | Broutin et al. | 372/32 |
| 6,421,120 B1 | | 7/2002 | Wildnauer | 356/243.1 |
| 6,441,933 B1 | * | 8/2002 | Jang | 398/79 |
| 6,546,028 B1 | * | 4/2003 | Tayebati et al. | 372/20 |
| 6,549,548 B2 | * | 4/2003 | Kuznetsov et al. | 372/32 |
| 6,570,894 B2 | * | 5/2003 | Anderson | 372/32 |
| 6,608,848 B2 | * | 8/2003 | Kleinschmidt et al. | 372/32 |
| 2002/0012368 A1 | * | 1/2002 | Kleinschmidt et al. | 372/32 |
| 2003/0021308 A1 | * | 1/2003 | Kuznetsov et al. | 372/32 |
| 2003/0174743 A1 | * | 9/2003 | Cliche et al. | 372/20 |

FOREIGN PATENT DOCUMENTS

| | | | | |
|---|---|---|---|---|
| WO | WO 0231931 | 4/2002 | | H01S/3/00 |
| WO | WO0231933 | 4/2002 | | H01S/5/00 |

OTHER PUBLICATIONS

Boucher et al; Calibrated Fabry–Perot Etalon as an Abvsolut Frequency Reference for OFDM Communications; IEEEPhotonics Technology Letters, vol. 4,No. 7, Jul. 7, 1992.*

(List continued on next page.)

Primary Examiner—Leon Scott, Jr.
(74) Attorney, Agent, or Firm—Fogg and Associates, LLC; Laura A. Ryan (57) ABSTRACT

A method and a system for filtering a user light beam using a periodic filter having a frequency response stabilized at an absolutely calibrated value are provided. A primary light beam is generated by a tunable laser source and portions thereof are filtered by an absolute reference filter and the periodic filter. First the frequency of the laser source is automatically locked on the absolute reference filter, and then the frequency response of the periodic filter is locked relative to the frequency of the laser source. The frequency response of the periodic filter is therefore continuously maintained at the proper calibration. User input and output are provided to pass the user light beam through the stabilized periodic filter independently of the filter stabilization process. A broadband absolutely calibrated optical source and a method for absolutely calibrating an optical spectrum analysis device are also provided.

45 Claims, 4 Drawing Sheets

OTHER PUBLICATIONS

R. Boucher et al. "Calibrated Fabry–Perot Etalon as an Absolute Frequency reference for OFDM Communications", IEEE Photonics Technol. Lett., vol. 4, No. 7, pp. 801–804, Jul. 1992.

C. Gamache et al. "An Optical Frequency Scale in Exact Multiples of 100 GHz for standardization of Multifrequency Communications", IEEE Photon. Technol. Lett. vol. 8, No. 2, pp. 290–292 Feb. 1996.

M. Têtu et al. "Ensemble of laser sources with evenly spaced absolute frequencies for optical frquency division multiplexed systems", SPIE Proceedings 1837, paper No. 29, Nov. 16–18, 1992.

M. Têtu et al. "Frequency–stabilized lasers for multifrequency optical communications: Work done at Université Laval" SPIE vol. 2378, Feb. 9–10, 1995.

Y. Sakai et al. "Frequency Stabilization of Laser Diode using a Frequency–Locked Ring Resonator to Acetylene Gas Absorption Lines" IEEE Photonics technol. Lett. vol. 3, No. 10 pp. 868–870, Oct. 1991.

Specifications of C2H2–EX calibrator of Wavelength Reference.

* cited by examiner

ABSOLUTELY CALIBRATED PERIODIC FILTERS AND SOURCES

This application claims priority to U.S. Provisional Patent Application Serial No. 60/364,742 filed Mar. 18, 2002 and titled "Absolutely Calibrated Periodic Filters and Sources" which is commonly assigned and incorporated by reference herein.

FIELD OF THE INVENTION

The present invention relates to optical devices and more particularly concerns periodic filters and sources.

BACKGROUND OF THE INVENTION

Wavelength Division Multiplexed (WDM) communication systems offer a high data transmission capacity by allowing multiple laser sources to transmit many high-speed data channels simultaneously over a single fiber, where each channel is transmitted at a unique optical frequency (or wavelength). In order to regularize the frequencies of the channels across telecommunication systems, the industry has adopted a standard which specifies that the nominal optical frequency of every channel should be at an integer multiple or submultiple of 100 GHz. On this uniform frequency grid, typical channel frequencies are therefore 193.100 THz, 193.200 THz, 193.300 THz etc. The frequency of these channels must typically be accurate within 2.5 GHz or 1.25 GHz or even better for correct system operations. During recent years, pressure to put more channels in the same fiber created a need for closer spacing at 50 GHz, 25 GHz, 12.5 GHz and so forth, with an accompanying increase of accuracy.

For a number of reasons, semiconductor lasers currently used in telecommunication systems do not intrinsically generate frequencies that are accurate or stable enough to be used alone in such a frequency grid system, whether they are narrowly or widely tunable lasers. First, current fabrication technologies do not allow to build lasers with a sufficiently accurate relationship between the frequency tuning signal and the actual frequency. Second, the frequency of the laser varies significantly with environmental factors or operating conditions such as injection current or temperature. Third, even if all other parameters are kept constant, the frequency of a laser tends to drift with aging. All these factors can easily detune a laser frequency beyond the accepted limit during its lifetime, and, if used alone, make it unsuitable for operation in a high performance telecommunication system.

Various means have been devised to stabilize the frequency of semiconductor lasers to a predetermined value with a sufficient accuracy. Many of those use an optical frequency reference filter that is sufficiently accurate and stable for telecommunication applications. This reference filter is used to compare the frequency of the laser with the desired predetermined value and generate an error signal which is fed back to the laser to correct its frequency. Once the feedback system is operational and the laser is frequency-locked, the stability of the reference filter is transferred to the laser.

Different optical reference filters have been used in the past to stabilize semiconductor lasers. Some atomic or molecular gases, for instance, exhibit absorption lines in the optical frequency range of telecommunication networks. The frequency of these absorption lines is determined by quantum mechanical laws and are generally extremely precise and stable with respect to environmental factors. These can therefore be considered as absolute reference filters since their accuracy does not depend on a factory calibration. Furthermore, the width of the absorption lines is very narrow, which allows for very sensitive frequency drift detection. Once properly frequency-locked to an absorption line, a laser can display frequency accuracy and stability orders of magnitude better than is required for current telecommunication systems. However, an important drawback of using a gas as a frequency reference is that the absorption lines that serve as references are not evenly spaced, do not occur at exact multiples or submultiples of 100 GHz, and are not present over the whole telecommunication bands.

Various types of optical interferometers or resonators can also be used as optical references to stabilize semiconductor lasers. Devices such as Fabry-Perot etalons or Mach-Zehnder or Michelson interferometers can easily be constructed and integrated into a laser transmitter for the purpose of frequency locking (hence the common name Wavelength Locker). These can be fabricated so that they display a periodic frequency response over a wide range of frequencies depending on the materials used. For instance, the spacing of transmission peaks can be tuned to be near 100 GHz, 50 GHz or whatever spacing is required for telecommunication applications. One drawback of these resonators or interferometric devices is that the accuracy of their frequency response is not absolute, that is, it is not intrinsic to the device but rather depends on their fabrication and installation processes. Further, their frequency response can change with external conditions such as mechanical stresses, temperature and aging. Although very good progresses have been made in constructing and packaging resonators or interferometers that have adequate stability performance for current telecommunication systems, these technologies may not be sufficient for the higher level of accuracy required for very closely spaced frequency grids of the future Dense Wavelength Division Multiplexing (DWDM) systems.

It would be advantageous for telecommunication systems and various kinds of optical instruments to use a device which provides an optical filter displaying a set of evenly spaced transmission peaks over a broad frequency spectrum such as a resonator or an interferometer, but whose frequency response can be known with the accuracy and stability inherent to atomic or molecular gas references. Indeed, DWDM transmitters could use such an absolute periodic reference for internal frequency alignment of the laser on finely spaced ITU sub-channels. Optical monitoring systems could even more be in need of such a calibration-free, low maintenance absolute frequency reference since they must act as a reliable watchdog over a number of channels. Furthermore, optical spectrum measurement instruments and widely tunable laser sources could use this absolute periodic spectrum to calibrate themselves over a wide range of frequencies.

Combining both periodic filters and absolute reference filters into a single apparatus is one step that can be taken to benefit from the properties of both devices. Additional devices and methods can then optionally be added to these optical devices in order to transfer the accuracy of the absolute reference filter to the periodic filter, thereby achieving an absolutely calibrated periodic filter. Such a system could effectively be used as an absolute, calibration-free periodic filter or wavelength locker if the following characteristics are present: a) the periodic filter frequency response is continuously calibrated and stabilized relative to the absolute reference filter; b) the calibration and stabilization procedures are completely automatic and c) the user is able to interrogate the periodic filter without disturbing or being disturbed by the stabilization system.

The general concept of combining an absolute reference filter with a periodic filter to obtain an extended high precision periodic reference is already known in the art. A number of applications of this concept have been previously disclosed in the scientific literature, patent applications and commercial products. These implementations solve some of the problems related to the realization of the absolutely calibrated periodic filter described before, but they still possess some significant drawbacks which are described below, and none presents all the characteristics of a absolute periodic filter that could transparently replace current periodic filters or wavelength lockers.

Figure 1A:
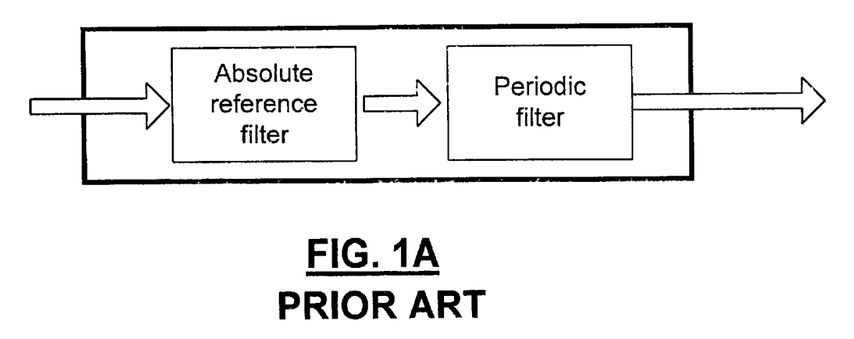
FIGS. 1A and 1B (PRIOR ART) are schematic representations of passive devices combining a periodic filter and a gas reference filter according to the prior art.
Figure 1B:
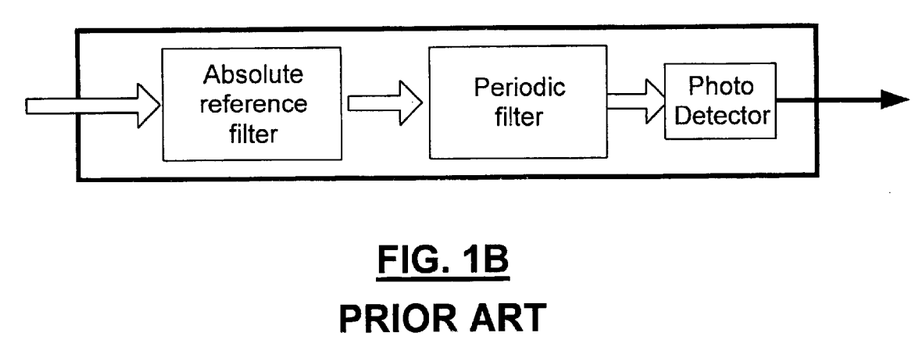

The C2H2-EX product family from Wavelength Reference, Mulino, Oreg., is one example of a passive (non-tunable) product combining a acetylene gas cell (absolute reference filter) with an etalon (periodic filter) which generates a comb of periodic transmission peaks. FIGS. 1A and 1B (PRIOR ART) show two particular implementations of the general principle behind this product family. In both cases, the etalon (also identified as optical artifact generator) is placed in series with the gas cell. This results in a combined frequency response where gas absorption peaks are superposed to the periodic transmission peaks of the etalon. The outputs are either the resulting optical signals after the filters (FIG. 1A), or the electrical signals of a photodetector which measures the power of the light after the filters (FIG. 1B).

The Wavelength References product has the disadvantage that the etalon frequency response is not tunable and therefore cannot be stabilized actively relative to the gas reference. It does not therefore constitute a periodic frequency reference that can be absolutely calibrated to match the standard telecommunication frequency grids or than can be used as an absolutely calibrated wavelength locker.

When a system or a device comprises both an absolute reference filter and a periodic filter which is frequency-tunable, it is possible to actively control the frequency response of the periodic filter so that it stays in a well known state relative to the absolute reference filter frequency response, thereby achieving absolute calibration of the periodic filter. There are many methods that can be used to stabilize a periodic filter against an absolute reference filter. One such method consists of simultaneously measuring the frequency response of the periodic filter and the absolute filter. Both responses are then compared and the exact frequency response of the periodic filter can be computed. This information is then used to actively tune the periodic filter to maintain its response to a specific value.

Another method to absolutely stabilize a periodic filter consists in using a laser source to simultaneously interrogate the absolute reference filter and the periodic filter. Than can be done by tuning the laser to align its frequency with that of an absorption or transmission feature of the absolute reference filter, and by also tuning the periodic filter in such a way that the laser frequency also coincide with an absorption or transmission feature of the periodic reference. A servo system can then be used to actively maintain the coincidence between the absolute reference and the periodic filter, and thus, ensure that the frequency response of the periodic filter does not move relative to the absolute reference. This second method generally yields a better frequency accuracy.

U.S. Pat. No. 4,856,899 (IWAOKA) describes such a periodic filter that is stabilized relative to an absolute reference filter using a single laser source. Iwaoka describes a tunable light source that is accompanied by a frequency marker system comprising a resonator frequency locked to a stabilized reference laser (FIG. 12 of the above-mentioned patent). Iwaoka also describes that such a reference laser can be obtained by locking a laser on a gas reference. However, this invention does not disclose how the system unambiguously calibrates itself by correctly selecting a specific features of the periodic filter and a specific feature of the absolute reference filter in order to perform the frequency stabilization. Failing to do so prevents the system from implementing a truly absolutely calibrated periodic filter because the frequency response of the stabilized filter cannot be guaranteed as explained below.

Automatically selecting which absorption feature of the periodic filter should be aligned with a specific feature of the absolute reference filter is one fundamental difficulty in implementing an absolute periodic filter. In many situations, many absorption features of the absolute filter are accessible by the laser source. Furthermore, the periodic filter provides a great number of similar transmission features (often called resonance modes, or simply modes) and many of these modes can be aligned with any of those absolute features. Each combination of alignment provides a different periodic filter calibration. In order to obtain a specific, unambiguous periodic filter calibration, there must be a method for selecting exactly which absolute feature and which mode are aligned together. Locking an unknown mode of the periodic filter to a unspecified feature of the absolute reference filter will provide a periodic filter that may be very stable but whose frequency response is still unknown. This would not provide a truly absolutely calibrated periodic filter.

Different solutions have been disclosed in the prior art to address the mode selection problem.

R. Boucher et al., <<Calibrated Fabry-Perot Etalon as an Absolute Frequency reference for OFDM Communications)>>, *IEEE Photonics Technol. Lett.*, vol. 4, pp. 801–804, July 1992, discloses a method for stabilizing a Fabry-Perot (FP) etalon using absorption lines from Krypton gas around 1300 nm. In this set-up, two laser sources, master and slave, are used to perform the mode selection. The master laser is frequency-locked to a Krypton absorption line and a transmission peak N of the FP is locked to this master reference. Once this is done, a slave laser is locked to a mode N+K, where K is a fixed value. If the correct mode is locked on the master laser, the slave laser light will be close to another absorption line of the Krypton gas and will be absorbed by a specific amount. Using the absorption as a selection criteria, a search can be performed to find which mode N of the FP etalon must be locked to the master laser in order to obtain the desired free spectral range (FSR) from the etalon. Once found, the master laser stays locked on the etalon to keep its frequency response stable, and the slave laser is no longer needed.

U.S. Pat. No. 5,434,877 (CHUNG) also proposes a similar technique. Two laser sources are frequency-locked to specific lines of Krypton around 1550 nm which have a precise frequency difference close to an integer multiple of the desired FSR. Then the FSR of the etalon is tuned until the two reference laser frequencies are precisely matched to two transmission peaks of the etalon, therefore maximizing their output power. This condition, which can be determined by measuring the frequency spectrum of the FP output, indicates that the correct modes have been found. The FP can be locked into its correct position by keeping this maximum power output with a servo loop.

C. Gamache et al., in <<An Optical Frequency Scale in Exact Multiples of 100 GHz for standardization of Multifrequency Communications>>, *IEEE Photon. Technol. Lett.*, vol. 8, pp. 2990–292, Febuary 1996, also describes a similar method to achieve a FSR of exactly 100 GHz. In this set-up lasers #1 and #2 are locked on two selected acetylene line, and lasers #3 and #4 are locked on two selected modes of a Fabry-Perot etalon. The correct tuning of the etalon is achieved when specific beat note frequencies are found between lasers #1 and #3, and between lasers #2 and #4. Once calibrated, the etalon can be frequency-locked with an offset introduced by RF mixing in order to obtain an etalon with a FSR of exactly 100 GHz.

All these methods solve the mode ambiguity problem, but those require the use of two or more lasers in order to correctly select the FP modes during the calibration phase. Once this is done, one or more lasers are no longer needed for normal operation of the stabilized FP. Using these extra lasers for such a limited function is cost-inefficient and increases the size and probability of failure of the system.

The absolute, continuous etalon stabilization method proposed in the prior art can easily be performed manually by a skilled operator, but it is not disclosed how the mode selection can be performed automatically nor how the reference lasers are automatically locked on the correct absorption line of the gas. In the context of a device used in an instrument or in a telecommunications system, all these operations should be automated so that the resulting stabilized etalon (or periodic filter) can be used as an absolute wavelength locker. Furthermore, in order to simplify system design, it would be advantageous that the "intelligence" required to implement the automatic frequency calibration of the laser and periodic filter be embedded with those components.

Also known in the art is the PCT application published under no. WO02/31933 (MAY) which discloses several concepts related to the automatic calibration and use of periodic filters. Of particular interest is the embodiment of FIG. 8 in that application, which discloses a tunable laser frequency-locked on an absolutely calibrated etalon. In this embodiment, the output of the laser is split and sent through both an absolute reference filter and an etalon such as a Fabry-Perot filter. The frequency of the laser is scanned and the resulting transmission spectrum of both the absolute reference filter and periodic filter are acquired as a function of the tuning conditions of the laser. A calibration curve for the frequency of the laser as a function of its operating parameters is then obtained, and used to tune the frequency of the laser to a selected value. The operating conditions of the etalon are then also tuned to align one of its transmission peaks with the frequency of the laser. The laser frequency is then locked on the output of the etalon for maintaining this frequency.

A significant drawback of the above system is that the link between the absolute reference filter and the etalon is not continuously maintained. In this system, the absolute reference filter serves only in initially calibrating the laser source. Once the initialization procedure is finished, the output of the laser is locked on the response of the etalon, whose frequency response may itself drift over time since the absolute reference filter no longer plays a role. The above mentioned patent warns that periodic re-calibrations of the system must be performed to ensure a proper alignment of the laser frequency. Since the absolute frequency response of the etalon is not maintained at all times, this therefore does not qualify as a truly absolutely calibrated periodic filter.

In order to use an absolutely calibrated periodic filter as an absolute etalon or wavelength locker, it would be advantageous for the user to be able to pass his light through the filter without perturbing the locking system and without being aware of the stabilization process. The prior art does not address the issue of how this user independence can be effectively obtained.

One possible disadvantage of implementing a stabilized periodic filter is that the required components (absolute reference filter, periodic filter, tuning mechanism, controller etc.) can occupy a significant space. This is a problem especially where the stabilized filter is embedded in a telecommunication transmitter card, or even in a laser module. For those applications, it would be advantageous to have many or all of the required components integrated in a small form-factor device.

A wideband, absolutely stabilized periodic filter could be used with a broadband light source to absolutely calibrate optical spectrum analysis devices or instruments such as Optical Spectrum Analyzers (OSA) or Optical Performance Monitoring (OPM) devices used in telecommunications network surveillance subsystems. To do so, the instrument may measure the transmission spectrum of the absolute periodic filter over a wide frequency range. Since the frequency of each transmission feature of the filter is known absolutely, the instrument can use those features to obtain densely spaced calibration points that would give the instrument a higher accuracy. To simplify the calibration phase, the instrument can use its initial calibration to identify each transmission feature of the periodic filter correctly, or the reference laser signal can be used to establish a distinctive reference point from which all the transmission features of the periodic filter are identified. Widely tunable lasers could also advantageously use an absolute periodic filter to dynamically calibrate their frequency while they are quickly sweeping over large frequency spans.

Finally, it is known in the prior art that simple optical frequency measurement systems can be implemented by measuring the transmission of an optical signal through two or more optical filters and comparing the relative amplitude of each filter to compute the optical signal's frequency. In such a system, however, the long-term accuracy of the measurement is dictated by the stability of the filters. It would therefore be advantageous for such a system to use an ensemble of filters that are frequency-stabilized to an absolute reference filter in order to obtain enhanced accuracy.

OBJECTS AND SUMMARY OF THE INVENTION

It is therefore an object of the present invention to provide a periodic filter which is stabilized so that it remains absolutely calibrated, which may be used for filtering a user light beam independently of the calibration and stabilization process.

It is another object of the invention to provide a method for filtering a user light beam that provides an absolutely calibrated periodic signal.

It is another object of the present invention to provide an optical source generating an absolutely calibrated broadband periodic signal.

It is yet another object of the present invention to provide a method for absolutely calibrating an optical spectrum analysis device having a broadband frequency response.

It is a preferential object of the present invention to provide a device and method which alleviates the above-explained drawbacks of the prior art.

Accordingly, the present invention concerns an absolutely calibrated optical filtering device for filtering a user light beam, based on a periodic filter having a frequency response including a plurality of substantially regularly-spaced spectral features.

A filter stabilizing assembly is provided for stabilizing the frequency response of the periodic filter at an absolutely calibrated value. The filter stabilizing assembly first includes an absolute reference filter having a transmission spectrum which includes at least one absolutely known absorption feature. A tunable laser source generates a primary light beam at a tunable frequency, at least a portion of this primary light beam being filtered by the absolute reference filter to generate a reference filter beam. At least a portion of the primary light beam is filtered by the periodic filter to generate a periodic filter beam. The filter stabilizing assembly also includes means for separately obtaining a reference filter signal and a periodic filter signal from the reference filter and periodic filter beams, respectively. Laser locking means are connected to the tunable laser source and use the reference filter signal for locking the frequency of the tunable laser source relative to a selected one of the absorption features of the absolute reference filter. Finally, filter stabilizing means are connected to the periodic filter and use the periodic filter signal for stabilizing the frequency response of the periodic filter by locking one of the spectral features thereof relative to the frequency of the tunable laser source.

The filtering device also includes a user input receiving the user light beam and propagating the same through the periodic filter, thereby generating a filtered user light beam according to the frequency response of the periodic filter. A user output is also provided, outputting the filtered user light beam independently of the periodic filter beam.

In accordance with another aspect of the present invention, there is also provided a method for filtering of a user light beam. This method includes the following steps:

A- providing a periodic filter having a frequency response including a plurality of substantially regularly-spaced spectral features;

B- stabilizing the frequency response of this periodic filter at an absolutely calibrated value, the stabilizing comprising the steps of:
  a) generating a primary light beam at a tunable frequency with a tunable laser source;
  b) filtering at least a portion of the primary light beam through an absolute reference filter having a transmission spectrum which includes at least one absolutely known absorption feature to generate a reference filter beam;
  c) filtering at least a portion of the primary light beam through the periodic filter to generate a periodic filter beam;
  d) separately obtaining a reference filter signal and a periodic filter signal from the reference filter and periodic filter beams, respectively;
  e) locking the frequency of the tunable laser source relative to a selected one of the absorption features of the absolute reference filter using the reference filter signal; and
  f) stabilizing the frequency response of the periodic filter using the periodic filter signal by locking a selected spectral feature of the frequency response relative to the frequency of the tunable laser source;

C- receiving the user light beam and propagating the same through the periodic filter, thereby generating a filtered user light beam according to the frequency response of the periodic filter; and D- outputting the filtered user light beam independently of the periodic filter beam.

In accordance with yet another aspect of the present invention, there is also provided an absolutely calibrated optical source for generating a broadband periodic light beam.

The source first includes a periodic filter having a frequency response including a plurality of substantially regularly-spaced spectral features. A filter stabilizing assembly is provided. It includes an absolute reference filter having a transmission spectrum which includes at least one absolutely known absorption feature. A tunable laser source is provided and generates a primary light beam at a tunable frequency, at least a portion of this primary light beam being filtered by the absolute reference filter to generate a reference filter beam, and at least a portion of the primary light beam being filtered by the periodic filter to generate a periodic filter beam. Means are provided for separately obtaining a reference filter signal and a periodic filter signal from the reference filter and periodic filter beams, respectively. Laser locking means are connected to the tunable laser source and use the reference filter signal for locking the frequency of the tunable laser source relative to a selected one of the absorption features of the absolute reference filter, thereby generating a stabilized laser signal. Filter stabilizing means are connected to the periodic filter and use the periodic filter signal for stabilizing the frequency response of the periodic filter by locking one of the spectral features thereof relative to the frequency of the stabilized laser signal.

The optical source also includes a broadband light source generating a broadband light beam. Means are provided for propagating the broadband light beam through the periodic filter, thereby generating the broadband periodic light beam according to the frequency response of the periodic filter. An output outputs the broadband periodic light beam.

In preferred embodiments, the absolutely calibrated optical source above may output the periodic broadband signal combined with the periodic filter beam, or independently.

Advantageously, the absolutely calibrated optical source above may be used for absolutely calibrating an optical spectrum analysis device having a broadband frequency response. The corresponding method includes:
  a) providing an absolutely calibrated optical source as above; and
  b) using the broadband periodic light beam to calibrate a plurality of points of the frequency response.

According to an alternative embodiment, this method may also involve the following steps:
  a) providing an absolutely calibrated optical source as above outputting the periodic broadband beam and periodic filter beam combined;
  b) using the periodic filter beam to absolutely calibrate a first point of the frequency response of said spectrum analyzer; and
  c) using the broadband periodic light beam relative to said first point of the frequency response of said spectrum analysis device to calibrate a plurality of points of said frequency response.

Other features and advantages of the present invention will be better understood upon reading of preferred embodiments thereof with reference to the appended drawings.

DESCRIPTION OF PREFERRED EMBODIMENTS OF THE INVENTION

The present invention provides an optical filtering device which is advantageously absolutely calibrated, is constantly maintained so but may still be used to filter a user light beam independently of the process necessary to maintain this calibration. In other words, the calibration process is "transparent" for the user light beam.

Figure 2A:
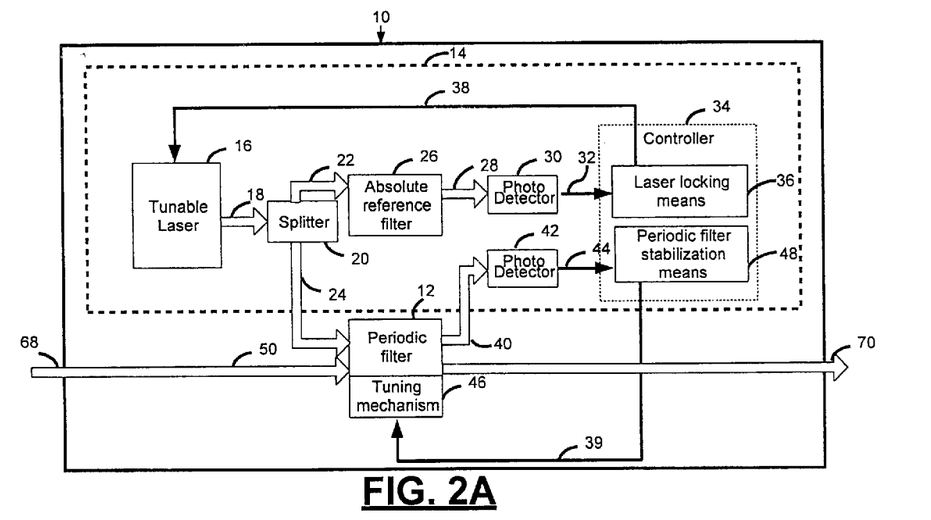
FIGS. 2A and 2B are schematic representations illustrating absolutely calibrated optical filtering devices according to preferred embodiments of the present invention, respectively showing the absolute reference filter and periodic filter in parallel and in series and where the user light beam uses an independent path from the periodic filter stabilization beam.
Figure 2B:
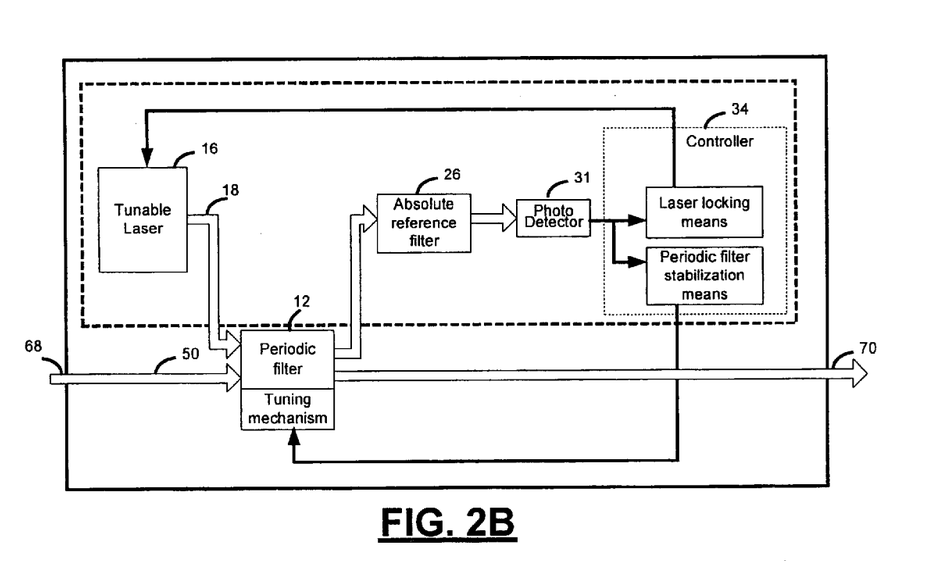

Referring to FIGS. 2A and 2B, there is schematized an optical filtering device 10 including a periodic filter 12 and a filter stabilizing assembly 14 for stabilizing the frequency response of the periodic filter 12 at an absolutely calibrated value.

By "periodic filter", it is here understood that the present invention may be applied to any optical filter having substantially regularly-spaced spectral features. Those skilled in the art will recognize that the periodic filter 12 may be implemented in many ways, with optical interferometers, optical resonators, other devices or a combination of devices. For example, it can be a solid-state Fabry-Perot etalon, an air gap etalon, a Mach-Zehnder or Michelson interferometer, a Bragg filter, a ring cavity resonator etc. Depending on the type of materials used in the construction of this device, the frequency range in which the periodic filter 12 will provide regularly-spaced absorption or transmission features may vary. Resonators with metallic coatings and dielectric coatings will behave differently in terms of loss, dispersion and frequency range. It is also understood that due to dispersion and other non-linear effects in the periodic filter, the spacing and relative amplitude of the absorption or transmission features may vary across the usable frequency range. This does not impair the functionality of the invention, since these effects are either negligible or can be compensated or taken into account into the design of a particular device.

It will be understood that the invention also apply to periodic optical filters having a plurality of optical outputs. Devices such as Arrayed Waveguides (AWG), optical interleavers, optical multiplexers and other devices may be stabilized by applying the absolute filter stabilization technique of the present invention to one single output of such multiple-output filters.

The filter stabilizing assembly used to calibrate and maintain calibrated this periodic filter will now be described.

Referring to FIG. 2A, in accordance with a first preferred embodiment, the filter stabilizing assembly 14 includes a tunable laser source 16 generating a primary light beam 18 at a tunable frequency. The laser source 16 is preferably a semiconductor laser such as used for telecommunications applications, having an output beam of a frequency which is tunable by adjusting the operating conditions of the laser. In the preferred embodiment, all adjustments to the laser operating conditions are done electronically by a laser tuning mechanism integral to the tunable laser source 16. Any type of narrowly or widely tunable laser is appropriate to the task, as long as it may tune in the frequency range where the absolute reference filter possesses known absorption or transmission features. For instance, the laser source can be DFB lasers, DBR lasers, VCSEL lasers, external cavity lasers (ECL). Non laser sources can also provide the same functionality as a laser source if they emit light at a sufficiently narrow bandwidth whose center frequency is tunable. Those skilled in the art will recognize that a large optical bandwidth source (a LED, ASE source or others) can be filtered with a narrow tunable filter (tunable Bragg grating, rotating diffractive grating, thin film filter or others) to provide an adequate source.

In the embodiment of FIG. 2A, the primary beam 18 is preferably directed to a beam splitting device 20 which splits it into two components, a first light beam 22 and a second light beam 24. Depending on the type of optical set-up of a particular embodiment, the beam splitting device 20 may be embodied in a plurality of manners, such as a beam splitter, a fiber coupler, a Y-shaped waveguide, a semitransparent mirror or any other device that can separate an incoming light beam into at least two separate beams. The beam splitting device 20 may be a standalone device, or alternatively be integrated to other components of the system. The primary beam 18 may be split into equal components, or according to any appropriate proportions. It is not necessary that the first and second light beams 22 and 24 receive together the entire power of the primary beam 18; loss may be experienced at the beam splitting device 20, or additional light components may be extracted therefrom for other uses.

The first and second light beams 22 and 24 are directed onto different paths. The first light beam 22 is sent to an absolute reference filter 26 having a transmission spectrum which includes at least one absolutely known absorption feature. A reference filter beam 28 is therefore generated. It will be understood that by "absolutely known" absorption feature it is meant that the frequency of this feature is known with a sufficient and generally high accuracy independently of a factory calibration. The feature can be a transmission maximum, minimum, midpoint, or any convenient point in the frequency spectrum of the filter. Depending on how the transmission feature is measured, it may not be necessary to know the amplitude of the feature with any accuracy to pinpoint the feature at a point with an absolutely known frequency. The maximum point of a peak is an example of amplitude-independent frequency reference point. A point situated to slope on the left or right of a transmission peak, at a specific amplitude relative to the maximum amplitude of the feature, is another example of an absolute frequency reference point.

The absolute reference filter 26 may be embodied by any of a plurality of devices. For example, a transparent cell containing a gas such as $C_2H_2$, $CO_2$, $H_2O$, $CH_4$, $NH_3$, HF, HCN, HI, $O_2$, their isotopes, or other appropriate atomic or molecular gases or combination of gases may be used. Alcali gases such as $I_2$, Rb, Cs, F or others can advantageously be used for operating the system at shorter wavelengths. Optogalvanic cells, optically pumped gas cells or other gas excitation cells may be used to observe the absorption of gases that need excitation in order to absorb light and therefore provide absorption featured in the desired frequency range. Alternatively, a number of different cells in series can provide more absorption lines while avoiding broadening the absorption lines that can be caused by gas mixing. If the absorption of a gas is too small to be usable, a multi-pass cell can be used to allow more absorption to occur. Although atomic or molecular absorption cells are excellent absolute references, any other device that provides a well known frequency response or a traceable resonance may be used.

It is understood that the function of the gas cell can be fulfilled by various other physical configurations other than a sealed hollow glass cylinder. Indeed, other materials or combinations of materials could be used instead of glass to realize the cell, such as metals and plastics. Also various techniques can be used to allow some of the energy of a light beam to pass through an atomic or molecular gas and thereafter be measured and implement the same function as a gas cell. For example, hollow optical fibers filled with gas would provide the required absolute absorption lines. Planar waveguides could take advantage of the surface evanescent light to simply interrogate a gas placed on top of the waveguide. Such a technique would allow a simple metallic gas cell to be used without requiring a window, and would not have the reflection problems caused by the usual glass interface.

In accordance with the present embodiment, the reference filter beam 28 outputted by the absolute reference filter 26 is used to lock the frequency of the tunable laser source 16 relative to a selected absorption feature of the absolute reference filter 26. Preferably, the means to accomplish this laser locking are embodied by a detector 30, the laser controlling mechanism and a first controlling means 36. The detector 30 detects the reference filter beam, transforming it from a light beam into a proportional electronic reference filter signal 32. The reference filter signal 32 is then sent to a controller 34, an application thereof embodying the first controlling means 36. The controller 34 analyzes the reference filter signal 32 and sends a laser control signal 38 to the laser tuning mechanism. In a preferred embodiment, the controller selects the correct absorption feature of the absolute reference filter to lock the laser and establish a servo loop to lock the laser on that feature. To do that, the controller 34 may induce a dithering of the frequency of the tunable laser source 16, extract a corresponding error signal from the reference filter signal and use this error signal to close the loop. This technique and other advantageous methods of realizing the laser calibration and locking using the present system will be explained further below. It will be noted that operating this set-up continuously allows not only to maintain the laser frequency fixed, but also fixed at a known calibrated value.

The second light beam 24 is sent to the periodic filter 12 to be filtered into a periodic filter beam 40. The periodic filter beam 40 may either be transmitted or reflected by the periodic filter 12, depending on the design of the periodic filter 12 and the optical set-up of the system 10. Filter stabilizing means are provided for stabilizing the periodic filter 12 by locking one of its transmission features on the frequency of the tunable laser source. In the preferred embodiment, these means are embodied by a second detector 42 detecting the light of the periodic filter beam 40 from the periodic filter and transforming it into a proportional electronic periodic filter signal 44, a filter tuning mechanism 46 for tuning the frequency response of the periodic filter 12, and second controlling means 48, preferably embodied by an application of the controller 34. The controller 34 therefore receives the periodic filter signal 44 from the second detector 42, analyzes this signal and controls the filter tuning mechanism 46 based on this analysis using the periodic filter tuning signal 39. In the preferred embodiment, the controller selects the correct periodic filter mode to be locked on the laser. The controller may lock the periodic filter 12 on the tunable laser source by using the same dithering of the frequency of the tunable laser source 16 that was used to lock the laser. This and other stabilizing methods will be explained in detail further below.

The tuning mechanism 46 used to modify the frequency response of the periodic filter 12 can also be implemented in many ways. Piezo-electric elements can be used to vary the optical length of the resonator or interferometer, or change its physical position or angle relative to the incident light, therefore effectively varying its frequency response. Thermal, magneto-optic or electro-optic effects can also be exploited to achieve the same goal. Direct thermal effects will change the properties of the materials or the physical dimensions of the periodic filter. Thermal effects can also affect the position or angle of the periodic filter by affecting the length of various elements of its mechanical mounting. The periodic filter can also be implemented using MEMS technologies in order to provide a compact, tunable low power device.

Referring to FIG. 2B, there is shown an alternate embodiment of the filter stabilizing assembly explained above. In this new embodiment, the primary beam 18 is sent directly to the periodic filter 12 and the absolute reference filter 26 and periodic filter 12 are disposed in series instead of in parallel. In this case, the separation of the reference filter and periodic filter signals is done electronically after detection of the light signal by a single detector 31 after its passage through both filters 26 and 12. Any separation techniques may be used for this operation. Preferably, the controller 34 performs the separation of the signals. Once separated, the reference filter and periodic filter signals may be used to respectively lock the frequency of the tunable laser source 16 and stabilize the frequency response of the periodic filter 12 as explained above. The separation may be done as in the following example. If an absolute reference filter displaying narrow width features is used in combination with a periodic filter displaying broad peaks (low finesse), an amplitude-based separation technique may be used. This would be done by applying successively a small and a large frequency dithering to the laser. The narrow reference peak of the absolute reference filter would transform the small frequency dithering in a significant amplitude modulation of filtered filter beam, while the relatively larger, flatter shape of the periodic filter would cause a negligible effect. A large dithering would create a significant amplitude modulation from the periodic filter superposed by the relatively short spikes caused by the absolute reference filter. These spikes could be removed by signal processing or can simply be ignored for they will cause negligible effect on the periodic filter stabilizing system. The controller can then use the modulation amplitude resulting from the small and large dithering to successively update the tunable laser and periodic filter frequency and therefore maintain both devices locked.

The series configuration of this embodiment could advantageously be implemented by including a solid Fabry-Perot etalon filter inside a reference gas cell, or by including the reference gas inside a hollow (air-gap) Fabry-Perot etalon. This would reduce the size of the filter stabilizing set-up.

In the embodiments of FIGS. 2A and 2B, the stabilized periodic filter 12 implemented by the present invention is used to filter a user light beam 50 that is provided at a user input 68, and outputs the filtered user light beam 70 independently of the filter stabilizing beam, that is, the user light does not affect the reference filter signal and the periodic filter signals and the light generated by the internal stabilized laser is not a part of the outputted beam.

FIG. 2A show one preferred manner of embodying these user input and output in the case where the absolute reference filter 26 and periodic filter 12 are in parallel. In FIG. 2A, the user input 68 leads the user light beam 50 directly at the periodic filter 12, where it propagates through the periodic filter separately from the second light beam 24 used for stabilizing the periodic filter. The user light beam 50 after filtering by the periodic filter 12 is then outputted from the device at output 70. Preferably, to pass both beams 24 and 50 through the periodic filter, the beams are collimated into two closely-spaced parallel beams, passed side by side through the filter and then re-separated with mirrors, pinholes, or other optical components. Both beams therefore see substantially the same frequency response from the periodic filter. In this embodiment, it is preferable to position the second detector 42 so that it measures the filter stabilizing beam 40 without blocking the filtered user light beam 50. In other implementations, both beams 24 and 50 could pass the periodic filter at a different angle, or in different sections of the periodic filter. This could ease the beam separation set-up, but could cause both beams to see a different periodic filter frequency response.

It is acceptable that the frequency response experienced by the user light beam 50 be different from the one experienced by the second light beam 24 because of a divergence in both optical beams, the geometry of the periodic filter, or any other reasons. In such a condition, the invention will still perform an absolutely calibrated periodic filter as long as the stabilization of the frequency response experienced by the second light beam 24 will substantially stabilize the frequency response experienced by the user light beam 50. Any frequency response difference, if known, can be compensated by software and will still provide sufficiently accurate frequency reference points.

FIG. 2B shows an embodiment also featuring an independent user beam path as in FIG. 2A, but in a system where the periodic filter is connected in series with the absolute reference, as described above. The user signal 50 pass through the stabilized periodic filter without mixing with any of the periodic filter stabilizing beams. In this implementation, the periodic filter can be placed before or after the absolute reference filter while yielding the same result. Any of the embodiments above for the user input and output could be applied to the case where the absolute reference filter and periodic filter are disposed in series.

Figure 4A:
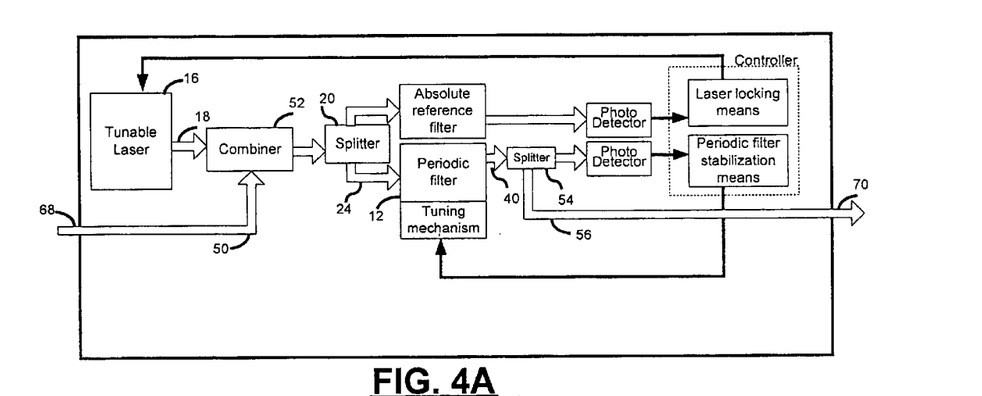
FIGS. 4A and 4B are schematic representations illustrating absolutely calibrated optical filtering devices according to another preferred embodiment of the present invention, respectively showing the absolute reference filter and periodic filter in parallel and in series where the user light beam and periodic filter beam are isolated by wavelength-dependant optical components.
Figure 4B:
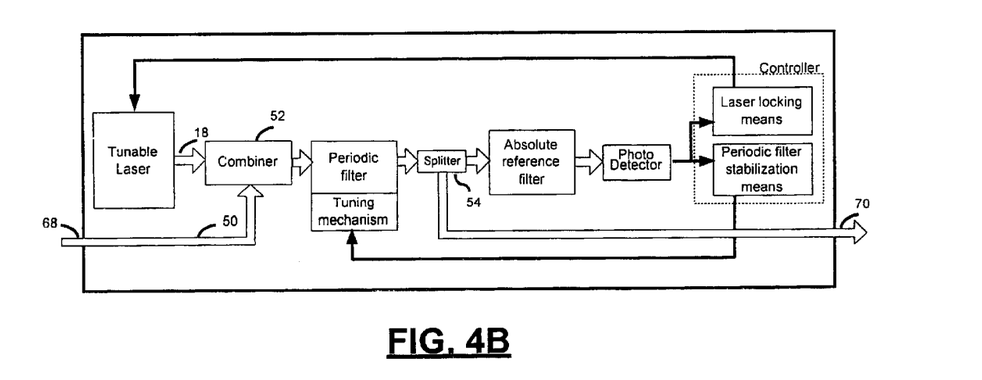

Now referring to FIGS. 4A and 4B, there is shown an alternative manner of obtaining the user light beam separately from the periodic filter beam.

In the embodiment of FIG. 4A, a beam combiner 52 is disposed between the tunable laser source 16 and the beam splitting device 20 for combining the user light beam 50 to the primary light beam 18, both beams being provided at substantially different wavelengths. A portion of the user beam 50 is therefore sent to the periodic filter 12 with the second light beam 24 and filtered therewith. Alternatively, the combiner may be positioned between the beam splitting device and periodic filter, therefore combining the user light beam 50 to the second light beam only. In either embodiments, means to extract the filtered user light beam from the periodic filter beam 40 outputted by the periodic filter 12 are also provided. Preferably, a wavelength dependant beam splitter 54 or any other appropriate wavelength dependant beam splitting device is provided downstream the periodic filter 12. In this manner, the beam exiting the periodic filter may be optically filtered to separate the filtered user light beam 56 from the periodic filter beam 40 based on the wavelength of both beams. For example, this may be accomplished by using a dichroic beam splitter. This can also be accomplished using a non wavelength-dependant beam splitter whose outputs are followed by wavelength dependent optical filters downstream from this splitter. The second photodetector itself may behave as a filtering device based on its wavelength sensitivity. Any optical arrangements which can separate the user light beam from the periodic filter beam based on the wavelength difference of these two beams is appropriate to the task.

For example, the user light beam wavelength can be around 1550 nm while the reference laser works at 1310 nm or at 850 nm. The frequency dependency of the optical components can therefore be selected so that 1550 nm beams do not affect the periodic filter locking, and that the stabilized laser light is not present in the user output beam.

FIG. 4B show another preferred manner of embodying the wavelength-based user signal separation, but implemented in a set-up where the absolute reference and the periodic filter are placed in series. In the embodiment of FIG. 4B, a combiner 52 is provided upstream the periodic filter for adding the user light beam 50 to the primary light beam 18. A wavelength-dependant beam splitter 54 is also provided downstream the periodic filter 12 for extracting the filtered user light beam from the filtered primary beam. This wavelength-dependant beam splitter can be placed before or after the absolute reference. If the user beam is extracted after being filtered by both filters, the user signal may experience additional absorptions caused by the reference filter.

Figure 3:
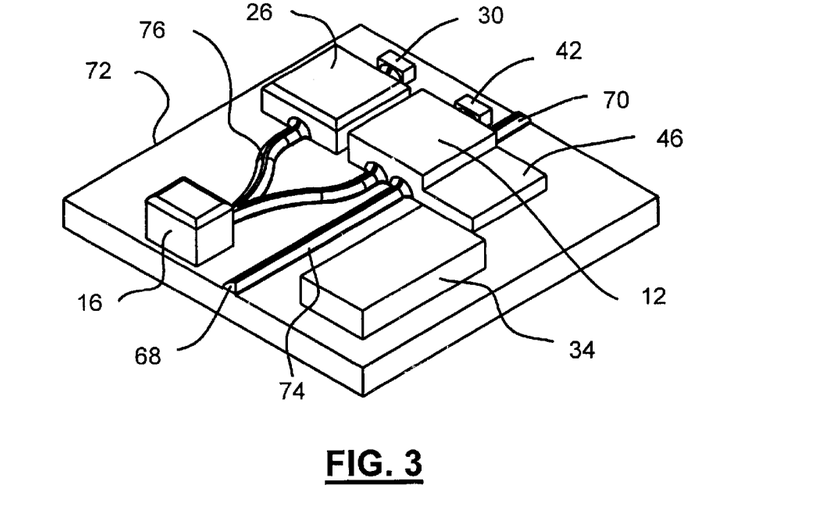
FIG. 3 is a perspective view of a device according to the embodiment of FIG. 2A.

Referring now to FIG. 3, there is shown in perspective a filtering device as schematized in FIG. 2A. In this device, the tunable laser source 16 is embedded with the absolute reference filter 12, the periodic filter 12 and the controller 34. All of these components are preferably integrated on a single optical chip using common integration techniques. A substrate 72 acts as the support for all the components of the device. This device can then effectively be used as an actively stabilized Fabry-Perot etalon. The controller 34 could also be external.

To use the device, the user input 68 leads the user light beam into an integrated waveguide 74. The light enters the periodic filter 12, passes through and exits at the output 70. The device behaves as an ordinary periodic filter, with the exception that the additional components on the substrate allow the periodic filter to be calibrated absolutely and remain so. The stabilization is done using the tunable laser source 16, which sends its light both into a sealed cavity containing the absolute reference filter 26 and into the periodic filter 12. The light is separated by a coupler realized with specialized waveguides 76. The light output from the absolute reference filter and periodic filter are measured by first and second photodetectors 30 and 42, whose signals are routed to the embedded controller 34. The periodic filter can be tuned by means of the tuning mechanism 46.

Alternatively, the present invention could be advantageously implemented by assembling the splitters, combiners, periodic filter, absolute reference and photodetectors as bulk-optics components along with a semiconductor laser chip inside a standard butterfly-type package. The package can be equipped with fibered inputs and outputs and fiber collimator lenses to pass the user light through the stabilized periodic filter. The controller electronics could also be installed inside the package. Such an arrangement would be compact and would meet the tight space constraints of telecommunication subsystems such as optical performance monitors.

Those skilled in the are will recognize that the functionality of the present invention could also be realized as well by using free-space propagating beams that by using fiber optics guided beams, optical waveguides, or any combination thereof.

Since the frequency response of the stabilized periodic filter is substantially uniform, it might be challenging for the user to identify exactly which transmission feature of the stabilized periodic filter is observed. In order to solve this problem, it might be advantageous to combine other optical filters with the periodic filter in order to provide a unique frequency response that allow the user to determine the frequency of his optical source with some degree of accuracy and therefore unambiguously identify the required features. Such a "mode identifier" could be implemented, for example, as two filters with a frequency response that intersect at a given frequency. Other periodic filters with a free spectral range (FSR) different from the main periodic filter may also be used to generate a complex sequence of transmission features that is much less repetitive than the periodic filter alone and which can be recognized.

In accordance with another aspect of the present invention, there is provided a method for filtering a user light beam. This method preferably is realized using an optical filtering device of the type described above.

The method first includes providing a periodic filter having a frequency response including a plurality of substantially regularly-spaced spectral features. This frequency response is then stabilized at an absolutely calibrated value.

Generally, the stabilization of the periodic filter is done in two steps : 1) stabilizing a laser using the absolute reference filter, and 2) stabilizing the periodic filter using the stabilized laser. The steps below explain in detail the steps of such a method according to preferred embodiments of the present invention.

First a primary light beam at a tunable frequency is generated using a tunable laser source. In a first embodiment, the primary light beam is split into first and second light beams, respectively propagating through an absolute reference filter as above and the periodic filter. A reference filter signal and a periodic filter signal are respectively obtained from the respective filtering (and subsequent detection) of the first and second light beams. Alternatively, the primary beam may be filtered sequentially by the periodic filter and absolute reference filter, and the reference filter signal and periodic filter signal separately obtained afterwards from electronic separation.

The frequency of the tunable laser source is then locked relative to a selected absorption feature of the absolute reference filter. Finding and selecting a specific absorption feature is not a trivial operation. Tunable laser sources generally do not have extremely well-defined frequency tuning characteristics, and those may change with environmental factors. Because of these factors, it is possible that the tunable laser source may be tuned to detect many absorption features of the absolute reference filter, but it is difficult to predict where a specific absorption features will appear relative to the tuning signal. Selecting the correct feature is required in order to ensure that the laser will be locked on the correct frequency all the time. Furthermore, this selection should be done automatically without user intervention.

In order to automatically find a proper absorption feature, the controller can be programmed with a calibration table which indicates the values of all the laser tuning signals (injection current, laser temperature etc) required to tune its frequency approximately to one or many absorption features. When the system is started-up, the controller sets the operating conditions of the laser to pre-calibrated values corresponding to the desired frequency, and then waits until the laser frequency is stabilized. If the laser tuning is reproducible enough, the laser frequency will be on the corresponding absorption feature.

If the pre-calibrated tuning is not accurate enough, the controller may do an additional step of fine-tuning the laser operating conditions to search for the absorption feature near the pre-calibrated frequency. If the pre-calibration is accurate enough, the closest absorption feature will be the one that was intended.

It is optionally possible for the controller to update the laser tuning calibration table once the absorption line has been found in order to compensate for long term drifts.

Another method of automatically finding the correct absorption feature consists in scanning the laser, through a variation of its operating conditions, measuring part of the absorption spectrum of the absolute reference filter, and performing a pattern matching algorithm in order to unambiguously identify the absorption features of the absolute reference filter. This results in a calibration of the frequency of the tunable laser source as a function of its operating conditions. U.S. Pat. No. 5,780,843 by Cliche et al., which is incorporated herein by reference, discloses such a method. Once the absorption features are identified and the laser tuning signal is calibrated, it is possible to select a proper absorption feature and tune the frequency of the laser thereon.

The next step in locking the frequency of the laser source preferably consists in activating a laser servo loop that maintains the frequency of the laser on a specific position of the absorption spectrum of the absolute reference filter. There are many methods to perform this locking. For example, a slight frequency dithering can be placed on the laser and its effect after the filter can be detected with a synchronous detection system, giving an error signal that can be used to close the loop. As another example, the laser can be locked slightly on one side or the other of the absorption feature by ensuring that the absorption of the filter remains at a constant value. All these function can be performed by special analog circuitry, or can be performed digitally by the controller.

It will be understood by one skilled in the art that the present invention is not limited to the locking of the laser specifically on the center of a transmission line of the absolute reference filter. The laser frequency may alternatively be locked at a predetermined point along the edge of a given line, or at any offset from the center of the line by applying the appropriate offset signals in the locking system. These alternatives have the advantage of allowing a selection of the value of the frequency of the laser source which may for example correspond to a pre-established telecommunication channel.

Once the frequency of the tunable laser source is locked, the periodic filter is stabilized by using the stabilized laser as an absolute reference.

In order to do that, two steps are preferably performed: 1) the periodic filter must be tuned in order to bring the right transmission mode close to the frequency of the stabilized laser, and 2) a filter servo loop is enabled to lock the periodic filter on the stabilized laser. The first of these step ensures that the right mode of the periodic filter will be locked on the stabilized laser, and therefore repeatedly and unambiguously ensure that the frequency response of the periodic filter is the one that is required.

In the preferred embodiment of this aspect of the invention, the controller of any of the embodiments of the system above possesses pre-calibration information that tells it which operating condition must be applied to the periodic filter in order to bring the correct spectral feature near the stabilized laser frequency. This information can be determined in factory and programmed into the controller. Each time the system is started and the periodic filter is locked, the table can be updated to compensate for device aging. External environmental measurements can be made to correct the calibration table for specific environmental conditions.

The second step to lock the periodic filter to the stabilized laser can be performed with specialized analog electronics or by the digital controller. The system can lock to the maximum or minimum of the frequency response near the selected mode by using a synchronous detection method which detects the effect of the laser dithering on the periodic filter photodetector. As with the laser locking, the resulting error signal may be used to close the filter servo loop. Alternatively the filter can be locked so that a specific transmission level is observed, allowing the locking point to be slightly tuned to obtain the required frequency response.

It must be noted that the laser and periodic filter stabilization processes can be activated periodically for brief periods of time in order to update the laser and the periodic filter tuning and therefore keep both devices absolutely stabilized. Such a periodic locking scheme allows the laser to be periodically turned off for lower power consumption or to avoid interference with the user signal.

Once the periodic filter is stabilized, the user light beam to be filtered is received in the device and launched to propagate through the periodic filter. A filtered user light beam filtered according to the frequency response of the periodic filter is thereby generated. The filtered user light beam is then outputted of the device independently of the periodic filter beam.

In a preferred embodiment, the user light beam is combined to the primary light beam. The combined beams then pass through the periodic filter and are afterwards separated from one another, Preferably, the filtered user light beam and filter stabilizing signal are separated according to frequency. In an alternative embodiment, the user light beam is propagated through the periodic filter in independent optical paths. In some systems which require the use of an absolute periodic filter on an intermittent basis only, it would be advantageous to use a periodic synchronization scheme as discussed above and to synchronize the stabilizing processes with the user system so that the user signal does not interfere with the stabilization process. Such a mode of operation would effectively implement a periodic filter which is continuously stabilized and whose user signal is effectively independent from the stabilizing process. In order to synchronize the user signal to the stabilization process, the controller can output a synchronizing signal to the user to indicate when the periodic filter is available or, inversely, the controller can receive a synchronization signal from the user to indicate it can perform the stabilization process.

In an alternative embodiment, the user signal and filter stabilizing beams could be separated according to their polarization. Indeed, if polarization maintaining fibers or optical components are used, the filtered light beam could be extracted from the combined beam by using polarizers or other polarization sensitive filters. This would effectively isolate the user beam from the stabilization process.

Figure 5A:
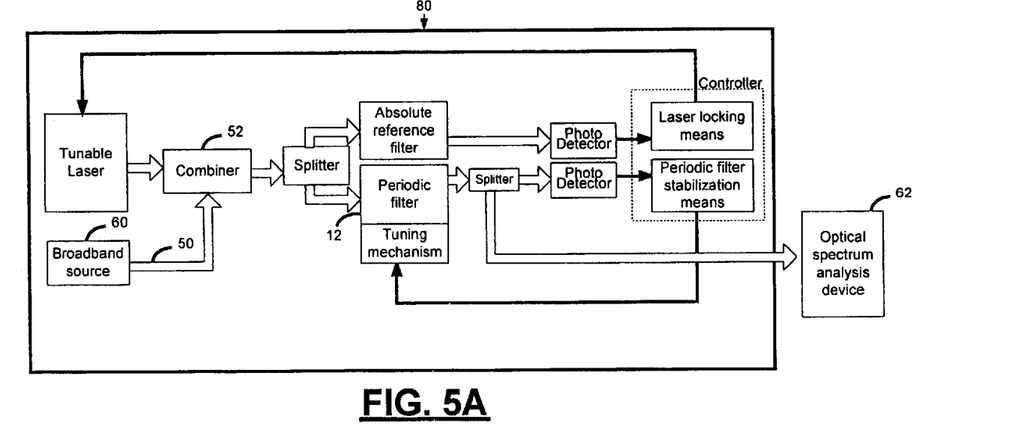
FIG. 5A is a schematic representation of an optical source according to another embodiment of the present invention and its use for calibrating an optical spectrum analysis device.
Figure 5B:
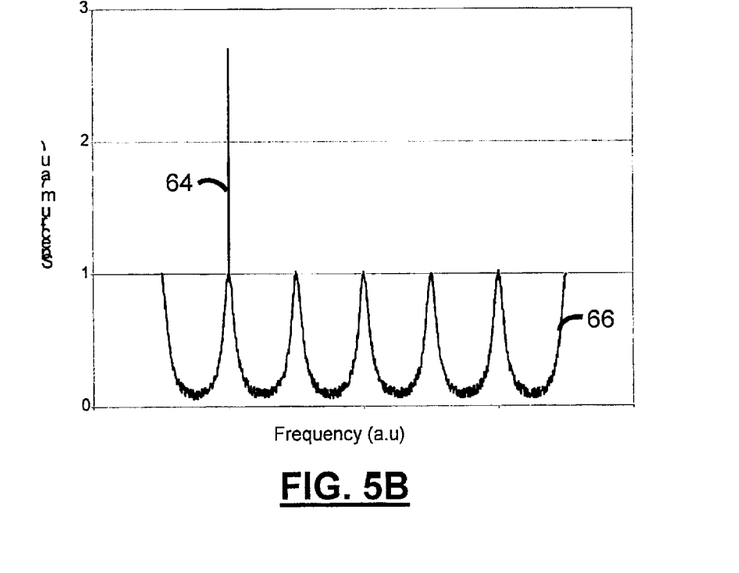
FIG. 5B is a graphical representation of the spectral output of the filter of FIG. 5A.

Referring to FIGS. 5A and 5B there is shown an absolutely calibrated optical source 80 for generating a broadband periodic light beam according to another aspect of the present invention. This source includes a periodic filter 12 and a filter stabilizing assembly as exemplified in any of the embodiments described above.

The absolutely calibrated optical source 80 includes a broadband light source 60 generating a broadband light beam 50. Tnis broadband light beam 50 is propagated through the periodic filter 12, for example by one of the schemes explained above, to generate a periodic broadband signal filtered according to the frequency response of the periodic filter 12. In the embodiment illustrated in FIG. 5A, a beam combiner 52 is provided to combine the broadband light beam to the primary light beam. Alternatively, the broadband light beam may be propagated through the periodic filter 12 independently from the periodic filter beam. In both cases, the filtered broadband beam is outputted from the absolutely calibrated periodic source so that it can be used by the user.

Advantageously, the optical source according to the current embodiment of the invention may be used in order to calibrate an optical spectrum analysis device such as an Optical Spectrum Analyzer (OSA). The system of FIG. 5A is similar to the one of FIG. 4, with the particularity that the user light beam 50 is replaced by the broadband light beam generated by the broadband light source 60, and that the outputted beam is a combination of both the periodic filter beam and the broadband periodic light beam. This combined beam is sent to an optical spectrum analyzer 62 to measure its optical spectrum. FIG. 5B illustrates the optical spectrum measured by the optical spectrum analysis device in such a set-up. As one skilled in the art will readily understand, the optical spectrum analyzer may in this manner be calibrated since the peak 64 generated by the internal laser can be used to calibrate the optical spectrum analysis device frequency scale at one known specific point. The absolute frequency of the periodic peaks resulting from the filtering of the broadband light beam by the periodic filter can then be deduced since they have an absolutely known spacing. These peaks can be used to extend the calibration of the instrument over its full working range.

Of course, numerous modifications could be made to the embodiments above without departing from the scope of the invention as defined in the appended claims.

What is claimed is:

1. An absolutely calibrated optical filtering device for filtering a light beam, comprising:

a periodic filter having a frequency response including a plurality of substantially regularly-spaced spectral features;

a filter stabilizing assembly, comprising:

an absolute reference filter having a transmission spectrum which includes at least one absolutely known absorption feature;

a tunable laser source generating a primary light beam at a tunable frequency, at least a portion of said primary light beam being filtered by the absolute reference filter to generate a reference filter beam, and at least a portion of the primary light beam being filtered by the periodic filter to generate a periodic filter beam;

means for separately obtaining a reference filter signal and a periodic filter signal from the reference filter and periodic filter beams respectively;

laser locking means connected to the tunable laser source, wherein the reference filter signal is adapted to lock the frequency of the tunable laser source relative to a selected one of the absorption features of the absolute reference filter; and filter stabilizing means connected to the periodic filter, wherein the periodic filter signal is adapted to the frequency response of said periodic filter by locking one of the spectral features thereof relative to the frequency of the tunable laser source;

an input receiving the light beam and propagating the same through the periodic filter, thereby generating a filtered light beam according to the frequency response of the periodic filter; and an output outputting the filtered light beam independently of the periodic filter beam.

2. The optical filtering device according to claim 1, wherein said input comprises a beam combiner disposed in a path of the primary light beam for combining the light beam and said primary light beam, and said output comprises a beam separating device disposed downstream the periodic filter for separating the filtered light beam and periodic filter beam.

3. The optical filtering device according to claim 2, wherein said beam separating device is frequency-dependent.

4. The optical filtering device according to claim 1, wherein the input and output are positioned to propagate the light beam through the periodic filter independently from the periodic filter beam.

5. The optical filtering device according to claim 1, wherein said absolute reference filter is a transparent gas cell.

6. The optical filtering device according to claim 5, wherein said transparent gas cell contains at least one gas selected from the group consisting of $C_2H_2$, $CO_2$, $H_2O$, $CH_4$, $NH_3$, HF, HCN, HI, $O_2$, $I_2$, Cs, Rb and their isotopes.

7. The optical filtering device according to claim 1, wherein said periodic filter is selected from the group consisting of optical interferometer and optical resonators.

8. The optical filtering device according to claim 1, wherein said means for separately obtaining the reference filter and periodic filter signals comprise:

a beam splitting device splitting the primary light beam into said portions of the primary light beam being respectively and parallely filtered by the absolute reference filter and the periodic filter, thereby separately generating the reference filter and periodic filter beams; and a first and a second detector respectively detecting the reference filter and periodic filter beams to obtain therefrom the reference filter and periodic filter signals.

9. The optical filtering device according to claim 8, wherein the beam splitting device is selected from the group consisting of a beam splitter, a fiber coupler, a Y-shaped waveguide and a semi-transparent mirror.

10. The optical filtering device according to claim 1, wherein:

the absolute reference filter is disposed in series with the periodic filter, said reference filter and periodic filter beams being thereby generated into a combined beam; and the means for separately obtaining the reference filter and periodic filter signals comprise:

a detector positioned to detect the combined beam and obtaining therefrom a combined signal; and electronic separating means for electronically separating the combined signal into said reference filter and periodic filter signals.

11. The optical filtering device according to claim 1, wherein the laser locking means comprise:

a laser tuning mechanism for tuning the frequency of the tunable laser source; and first controlling means for receiving the reference laser signal, analyzing said laser stabilizing signal and controlling the laser tuning mechanism based on said analyzing.

12. The optical filtering device according to claim 11, wherein the filter stabilizing means comprise:

a filter tuning mechanism for tuning the frequency response of the periodic filter; and second controlling means for receiving the periodic filter signal, analyzing said periodic filter signal and controlling the filter tuning mechanism based on said analyzing.

13. The optical filtering device according to claim 12, wherein the filter tuning mechanism is selected form the group consisting of a piezo-electric element, a thermal element, an electro-optic element, a magneto-optic element, a MEMS device and combinations thereof.

14. The optical filtering device according to claim 12, wherein the first controlling means causes a dithering of the frequency of the tunable laser source.

15. The optical filtering device according to claim 12, comprising a controller including said first and second controlling means.

16. A method for filtering of a light beam, comprising the steps of:

A- providing a periodic filter having a frequency response including a plurality of substantially regularly-spaced spectral features;

B- stabilizing the frequency response of said periodic filter at an absolutely calibrated value, said stabilizing comprising the steps of:

a) generating a primary light beam at a tunable frequency with a tunable laser source;

b) filtering at least a portion of the primary light beam through an absolute reference filter having a transmission spectrum which includes at least one absolutely known absorption feature to generate a reference beam;

c) filtering at least a portion of the primary light beam through the periodic filter to generate a periodic filter beam;

d) separately obtaining a reference filter signal and a periodic filter signal from the reference filter and periodic filter beams, respectively;

e) locking the frequency of the tunable laser source relative to a selected one of the absorption features of the absolute reference filter using said reference filter signal; and f) stabilizing the frequency response of said periodic filter using said periodic filter signal by locking a selected spectral feature of said frequency response relative to the frequency of the tunable laser source;

C- receiving the light beam and propagating the same through the periodic filter, thereby generating a filtered light beam according to the frequency response of the periodic filter; and D- outputting the filtered light beam independently of the periodic beam.

17. The method according to claim 16, wherein step e) of the stabilizing comprises the sub-steps of:
   i) tuning the frequency of the tunable laser source relative to the selected absorption feature; and
   ii) activating a laser servo loop monitoring the reference filter signal and adjusting operating conditions of the tunable laser source to maintain said frequency tuning relative to said selected absorption feature.

18. The method according to claim 17, wherein sub-step e) i) of the stabilizing comprises:
   varying the operating conditions of the tunable laser source to scan the frequency thereof over a predetermined range;
   measuring the reference filter signal as a function of said operating conditions;
   matching the measured reference filter signal to the transmission spectrum of the absolute reference filter;
   identifying the operating conditions corresponding to the selected absorption feature; and
   operating the tunable laser source at said identified operating conditions.

19. The method according to claim 17, wherein sub-step e) i) of the stabilizing comprises:
   setting the operating conditions of the tunable laser source to pre-calibrated values associated with tuning its frequency relative to said selected absorption feature;
   adjusting said operating conditions to fine-tune said frequency.

20. The method according to claim 19, wherein step e) of the stabilizing comprises an additional sub-step of iii) updating the pre-calibrated values of the operating conditions of the tunable laser source based on the adjusting thereof.

21. The method according to claim 17, wherein sub-step e) ii) of the stabilizing comprises:
   dithering the frequency of the tunable laser source;
   synchronously detecting an error signal in the reference filter signal caused by said dithering; and
   using the error signal to close said laser servo loop.

22. The method according to claim 16, wherein step f) of the stabilizing comprises the sub-steps of:
   i) tuning the selected spectral feature of the frequency response of the periodic filter relative to the frequency of the tunable laser source; and
   ii) activating a filter servo loop monitoring the periodic filter signal and adjusting operating conditions of the periodic filter to maintain said spectral feature with respect to the frequency of the tunable laser source.

23. The method according to claim 22, wherein sub-step f) i) of the stabilizing further comprises:
   setting the operating conditions of the periodic filter to pre-calibrated values associated with tuning the selected spectral feature relative to the frequency of the tunable laser source;
   adjusting said operating conditions to fine-tune said spectral feature.

24. The method according to claim 23, wherein step f) of the stabilizing comprises an additional sub-step of iii) updating said pre-calibrated values of the operating conditions of the periodic filter based on the adjusting thereof.

25. The method according to claim 22, wherein sub-step e) ii) of the stabilizing further comprises:
   dithering the frequency of the tunable laser source;
   synchronously detecting an error signal in the periodic filter signal caused by said dithering; and
   using the error signal to activate said filter servo loop.

26. The method according to claim 16, wherein step d) of the stabilizing comprises splitting the primary light beam into said portions of the primary light beam respectively being filtered by the absolute reference filter and the periodic filter, thereby separately generating the reference filter and periodic filter beams; and
   respectively detecting the reference filter and periodic filter beams to obtain therefrom the reference filter and periodic filter signals.

27. The method according to claim 16, wherein the absolute reference filter is disposed in series with the periodic filter, said reference filter and periodic filter beams being thereby generated into a combined beam, and wherein step d) comprises the sub-steps of:
   detecting the combined beam to obtain therefrom the combined signal; and
   electronically separating the combined signal into said reference filter and periodic filter signals.

28. The method according to claim 16, wherein said step of receiving the light beam comprises combining the light beam and the primary light beam, and the step of outputting the filtered light beam comprises separating the filtered light beam and periodic filter beam after filtering by time periodic filter.

29. The method according to claim 28, wherein the filtered light beam and periodic filter beam are separated according to frequency.

30. The method according to claim 16, wherein the receiving and outputting of the light beam comprises propagating said light beam through the periodic filter independently from the periodic filter beam.

31. An absolutely calibrated optical source for generating a broadband periodic light beam, comprising:
   a periodic filter having a frequency response including a plurality of substantially regularly-spaced spectral features;
   a filter stabilizing assembly, comprising:
      an absolute reference filter having a transmission spectrum which includes at least one absolutely known absorption feature;
      a tunable laser source generating a primary light beam at a tunable frequency, at least a portion of said primary light beam being filtered by the absolute reference filter to generate a reference filter beam, and at least a portion of the primary light beam being filtered by the periodic filter to generate a periodic filter beam;
      means for separately obtaining a reference filter signal and a periodic filter signal from the reference filter and periodic filter beams, respectively;
      laser locking means connected to the tunable laser source, wherein the reference filter signal is adapted to lock the frequency of the tunable laser source relative to a selected one of the absorption features of the absolute reference filter; and
      filter stabilizing means connected to the periodic filter, wherein the periodic filter signal is adapted to the frequency response of said periodic filter by locking one of the spectral features thereof relative to the frequency of the tunable laser source;
   a broadband light source generating a broadband light beam;
   means for propagating the broadband light beam through the periodic filter, thereby generating said broadband periodic light beam according to the frequency response of the periodic filter; and an output outputting the broadband periodic light beam.

32. The optical source according to claim 31, wherein the means for propagating the broadband light beam through the periodic filter comprise a beam combiner disposed in a path of the primary light beam for combining the broadband light beam and said primary light beam.

33. The optical source according to claim 32, wherein said output provides the broadband periodic light beam combined with the periodic filter beam.

34. (Original) The optical source according to claim 32, wherein said output comprises a beam separating device disposed downstream the periodic filter for separately providing the broadband periodic light beam and periodic filter beam.

35. The optical source according to claim 31, wherein the means for propagating the broadband light beam through the periodic filter comprise an input positioned to propagate the broadband light beam through the periodic filter independently from the periodic filter beam.

36. The optical source according to claim 31, wherein said absolute reference filter is a transparent gas cell.

37. The optical source according to claim 31, wherein said periodic filter is selected from the group consisting of optical interferometers and optical resonators.

38. The optical source according to claim 31, wherein said means for separately obtaining the reference filter and periodic filter signals comprise:
    a beam splitting device splitting the primary light beam into said portions of the primary light beam being respectively and parallely filtered by the absolute reference filter and the periodic filter, thereby separately generating the reference filter and periodic filter beams; and
    a first and a second detector respectively detecting the reference filter and periodic filter beams to obtain therefrom the reference filter and periodic filter signals.

39. The optical source according to claim 31, wherein the absolute reference filter is disposed in series with the periodic filter, said reference filter and periodic filter beams being thereby generated into a combined beams; and the means for separately obtaining the reference filter and periodic filter signals comprise:
    a detector positioned to detect the combined beam and obtained therefrom a combined signal; and
    electronic separating means for electronically separating the combined signal into said reference filter and periodic filter signals.

40. The optical source according to claim 31, wherein the laser locking means comprise:
    a laser tuning mechanism for tuning the frequency of the tunable laser source; and
    first controlling means for receiving the reference filter signal, analyzing said reference filter signal and controlling the laser tuning mechanism based on said analyzing.

41. The optical source according to claim 40, wherein the filter stabilizing means comprise:
    a filter tuning mechanism for tuning the frequency response of the periodic filter; and
    second controlling means for receiving the periodic filter signal, analyzing said periodic filter signal and controlling the filter tuning mechanism based on said analyzing.

42. The optical source according to claim 40, wherein the first controlling means causes a dithering of the frequency of the tunable laser source.

43. The optical source according to claim 42, comprising a controller including said first and second controlling means.

44. A method for absolutely calibrating an optical spectrum analysis device having a broadband frequency response, said method comprising the steps of:
    a) providing an absolutely calibrated optical source for generating a broadband periodic light beam, comprising:
        a periodic filter having a frequency response including a plurality of substantially regularly-spaced spectral features;
        a filter stabilizing assembly, comprising:
            an absolute reference filter having a transmission spectrum which includes at least one absolutely known absorption feature;
            a tunable laser source generating a primary light beam at a tunable frequency, at least a portion of said primary light beam being filtered by the absolute reference filter to generate a reference filter beam, and at least a portion of the primary light beam being filtered by the periodic filter to generate a periodic filter beam;
            means for separately obtaining a reference filter signal and a periodic filter signal from the reference filter and periodic filter beams, respectively;
            laser locking means connected to the tunable laser source and using the reference filter signal for locking the frequency of the tunable laser source relative to a selected one of the absorption features of the absolute reference filter; and
            filter stabilizing means connected to the periodic filter and using the periodic filter signal for stabilizing the frequency response of said periodic filter by locking one of the spectral features thereof relative to the frequency of the tunable laser source;
        a broadband light source generating a broadband light beam;
        means for propagating the broadband light beam through the periodic filter, thereby generating said broadband periodic light beam according to the frequency response of the periodic filter; and
        an output outputting the broadband periodic light beam; and
    b) using the broadband periodic light beam to calibrate a plurality of points of said frequency response.

45. A method for absolutely calibrating an optical spectrum analysis device having a broadband frequency response, said method comprising the steps of:
    a) providing an absolutely calibrated optical source for generating a broadband periodic light beam, comprising:
        a periodic filter having a frequency response including a plurality of substantially regularly-spaced spectral features;
        a filter stabilizing assembly, comprising:
            an absolute reference filter having a transmission spectrum which includes at least one absolutely known absorption feature;
            a tunable laser source generating a primary light beam at a tunable frequency, at least a portion of said primary light beam being filtered by the absolute reference filter to generate a reference filter beam, and at least a portion of the primary light beam being filtered by the periodic filter to generate a periodic filter beam;

means for separately obtaining a reference filter signal and a periodic filter signal from the reference filter and periodic filter beams, respectively;

laser locking means connected to the tunable laser source and using the reference filter signal for locking the frequency of the tunable laser source relative to a selected one of the absorption features of the absolute reference filter; and filter stabilizing means connected to the periodic filter and using the periodic filter signal for stabilizing the frequency response of said periodic filter by locking one of the spectral features thereof relative to the frequency of the tunable laser source;

a broadband light source generating a broadband light beam;

means for propagating the broadband light beam though the periodic filter, thereby generating said broadband periodic light beam according to the frequency response of the periodic filter, wherein the means for propagating the broadband light beam through the periodic filter comprise a beam combiner disposed in a path of the primary light beam for combining the broadband light beam and said primary light beam; and an output outputting the broadband periodic light beam, wherein said output provides the broadband periodic light beam combined with the periodic filter beam;

b) using the periodic filter beam to absolutely calibrate a first point of the frequency response of said spectrum analyzer; and c) using the broadband periodic light beam relative to said first point of the frequency response of said spectrum analyzer to calibrate a plurality of points of said frequency response.

* * * * *